United States Patent

Choi et al.

[11] Patent Number: 5,808,436
[45] Date of Patent: Sep. 15, 1998

[54] STARTING CIRCUIT AND STARTING METHOD FOR A BRUSHLESS MOTOR

[75] Inventors: Hyung-Mook Choi; Shi-Hong Park, both of Seoul, Rep. of Korea

[73] Assignee: Samsung Electronics Co., Ltd., Suwon, Rep. of Korea

[21] Appl. No.: 768,699

[22] Filed: Dec. 18, 1996

[30] Foreign Application Priority Data

Dec. 26, 1995 [KR] Rep. of Korea .................. 95 56508

[51] Int. Cl.⁶ ........................... G05B 19/28; H02P 1/23
[52] U.S. Cl. .................... 318/603; 318/138; 318/254; 318/607; 318/608
[58] Field of Search .................... 318/138, 139, 318/245, 254, 439, 264, 600–620, 277, 778; 388/842, 912, 903, 915

[56] References Cited

U.S. PATENT DOCUMENTS

| | | | |
|---|---|---|---|
| 4,162,435 | 7/1979 | Wright | 318/138 |
| 4,246,518 | 1/1981 | Kogler et al. | 318/138 |
| 4,376,914 | 3/1983 | Kimura | 318/603 |
| 4,827,201 | 5/1989 | Ito | 318/603 |
| 5,130,620 | 7/1992 | Inaji et al. | 318/254 |
| 5,144,209 | 9/1992 | Ingji et al. | 318/254 |
| 5,373,206 | 12/1994 | Lim | 318/138 |
| 5,397,972 | 3/1995 | Maiocchi | 318/439 |
| 5,592,058 | 1/1997 | Archer et al. | 318/254 |
| 5,616,996 | 4/1997 | Tang et al. | 318/439 |
| 5,663,616 | 9/1997 | Stringfellow et al. | 318/254 |

*Primary Examiner*—Paul Ip
*Attorney, Agent, or Firm*—Jones & Volentine L.L.P.

[57] ABSTRACT

In order to start a brushless motor, a frequency setting circuit sets a frequency value, a counter increases a count value in response to a main clock signal, and a comparator compared the value of the frequency setting circuit with that of the counter and resets the counter when the compared values are the same. A circuit is also provided for changing the frequency value of the frequency setting circuit to a high frequency value in response to an output signal of the comparator and a back electromotive force detection signal.

6 Claims, 4 Drawing Sheets

STARTING CIRCUIT AND STARTING METHOD FOR A BRUSHLESS MOTOR

BACKGROUND OF THE INVENTION

1. Field of the Invention

The present invention relates to a motor starting circuit and a motor starting method, and more particularly, to a starting circuit and a starting method for a brushless motor.

2. Description of the Prior Art

The most common type of small-size precision motor currently used in in the electronics industry is the brushless DC motor. To start the brushless DC motor, a magnetic pole detecting sensor for detecting a position of a rotor is normally required. Recently, however, a sensorless driving method has become widely utilized in which the motor is started without use of the magnetic pole detecting sensor by employing a back electromotive force generated when the motor rotates.

In the sensorless driving technique, the back electromotive force is not generated when the motor is in a stopped state at the beginning of the starting process, and the position of the magnetic pole can thus not be detected. Therefore, any suitable driving method is initially used to rotate the motor during a starting mode so as to generate the back electromotive force. Thus, information is obtained which allows for detecting the position of the magnetic pole. When the motor starts to rotate, the back electromotive force is created. If this back electromotive force is greater than a constant reference voltage, the starting mode ends in favor of the normal operating mode. In most such starting methods, a reference clock for performing rectification is of a fixed frequency, and the back electromotive force detected at the starting mode is amplified by an amplifier to be compared with the reference voltage. The reference voltage is set to a slightly high value in order to prevent malfunction or noise generation. Therefore, even though the motor may actually be rotating at the beginning of the starting process, if the back electromotive force is less than the reference voltage, the starting mode is maintained without changing over to the normal operating mode. On the other hand, a problem also arises if the reference voltage setting is changed to cause the normal operating mode to begin. That is, if the reference voltage is too low, the starting mode may prematurely be changed to the normal operating mode in a state where motor rotation has not taken place, thus resulting in a starting failure.

SUMMARY OF THE INVENTION

An object of the invention is to provide a starting circuit and a starting method for a brushless motor which can obtain a sufficient back electromotive force by converting a reference clock frequency from a low frequency to a high frequency.

According to one aspect of the invention, a starting circuit for a brushless motor includes a frequency setting circuit for setting a frequency value, a counter for counting upward in response to a main clock signal, a comparator for comparing a value of the frequency setting circuit with that of the counter, and for resetting the counter when the compared values are the same, and a circuit for changing the frequency value set by the frequency setting circuit to a high frequency value in response to an output signal of the comparator and a back electromotive force detection signal.

According to another aspect of the invention, a starting method of a brushless motor includes the steps of: setting a frequency value of a frequency setting circuit and increasing a count value of a counter; and resetting the counter by generating a comparison output signal when the frequency value and the count value of the counter are the same, determining whether a back electromotive force detection signal is generated, and if the back electromotive force detection signal is generated, changing the frequency value of the frequency setting circuit to a high frequency value and returning to the step of increasing the count value, and if the back electromotive force detecting signal is not generated, simply returning to the step of increasing the count value.

DETAILED DESCRIPTION OF PREFERRED EMBODIMENTS

Figure 1:
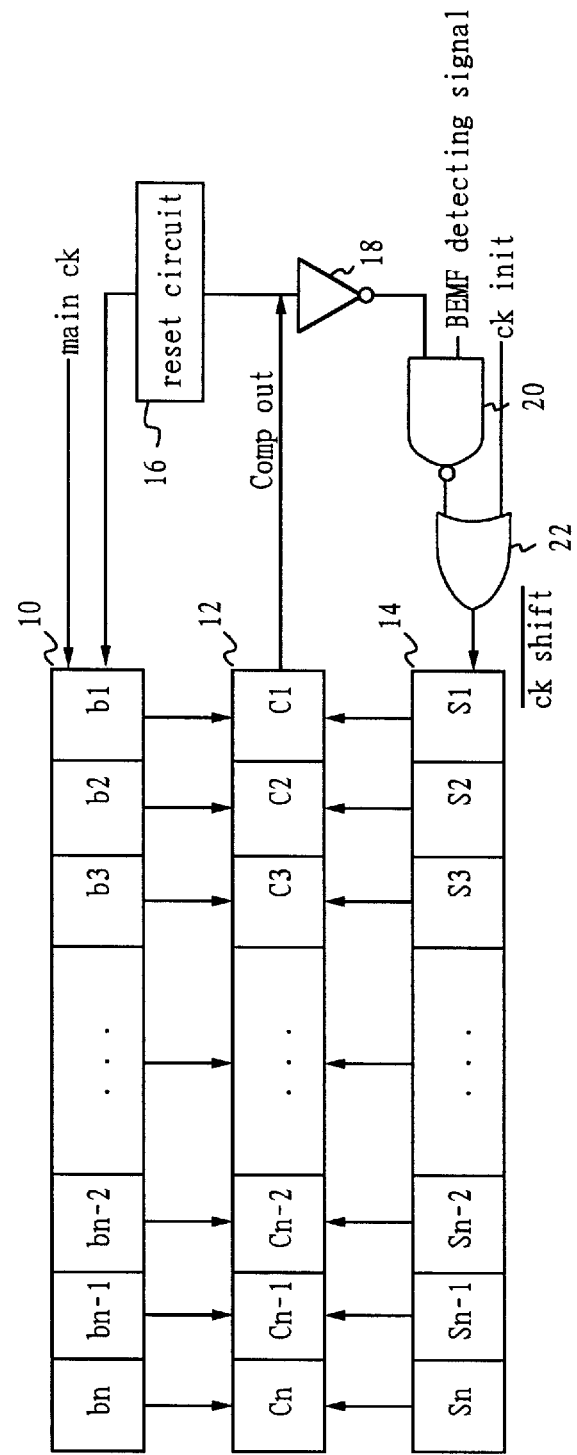
FIG. 1 is a circuit diagram of a starting circuit for a brushless motor according to the present invention.

Referring to FIG. 1, a starting circuit of a brushless motor includes an n-bit counter 10, an n-bit comparator 12, an n-bit shift register 14, a reset circuit 16, an inverter 18, a NAND gate 20 and an OR gate 22.

The n-bit counter 10 counts the pulses of a main clock signal and is reset in response to a reset signal from the reset circuit 16. The inverter 18 inverts a signal comp out also applied to the reset circuit 16. The NAND gate 20 implements a NAND logic operation of a back electromotive force (BEMF) detection signal and the output signal of the inverter 18. The OR gate 22 generates an inverted clock shift signal $\overline{\text{ck shift}}$ which is the logical OR of the output signal of the NAND gate 20 and a clock initialization signal ck init. The n-bit shift register 14 shifts data in response to the inverted clock shift signal $\overline{\text{ck shift}}$. The n-bit comparator 12 compares the output signal of the n-bit counter 10 with that of the n-bit shift register 14 and generates a comparison output signal comp out.

Figure 2:
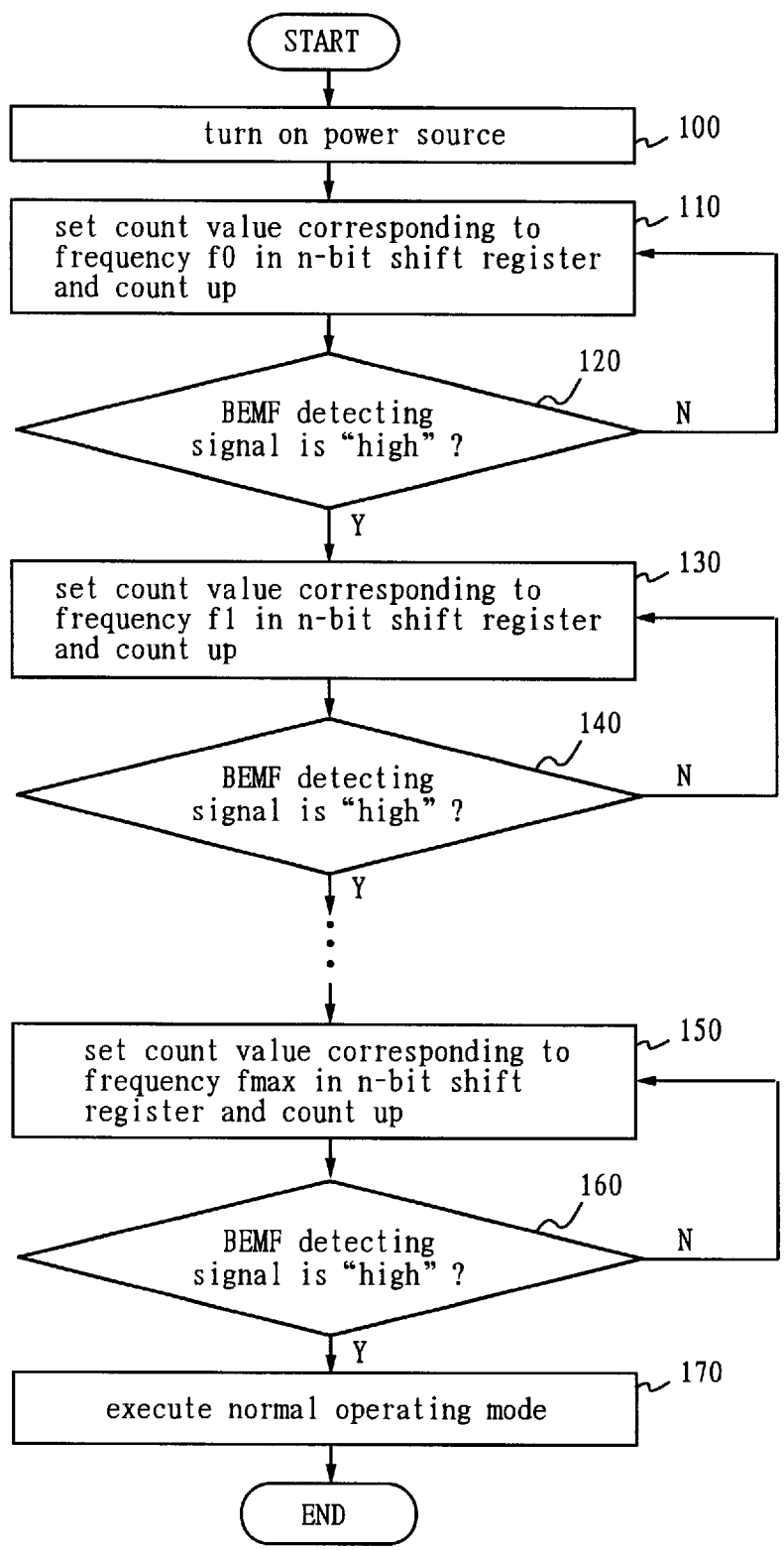
FIG. 2 is a flow chart showing an operation of the circuit of FIG. 1.

FIG. 2 is a flow chart showing an operation of the circuit of FIG. 1. At step 100, a power source is turned on. At step 110, a count value corresponding to an initial frequency f0 is set in the n-bit shift register 14, and the n-bit counter 10 receives the main clock signal and begins to count the pulses thereof. The logic state of the BEMP detection signal is checked at step 120, and if it is not a logic "high" state, the process returns to step 110. The BEMP detection signal becomes logic "high" if the back electromotive force is greater than a reference voltage. If the values of the n-bit counter 10 and the n-bit shift register 14 are the same, the n-bit comparator 12 generates a comparison output signal comp out of logic "low". The comparison output signal comp out of logic "low" causes the reset circuit to reset the n-bit counter 10. If the BEMF detection signal is logic "high" and the comparison output signal comp out is logic "low", the inverted clock shift signal $\overline{\text{ck shift}}$ is changed to logic "low" from logic "high". At step 130, the n-bit shift register 14 shifts 1-bit in a less significant bit direction to store the count value corresponding to a frequency f1 which is twice the frequency f0, and the n-bit counter 10 counts in response to the pulses of the main clock signal. If the count value of the n-bit counter 10 is equal to that stored in the n-bit shift register 14, the n-bit comparator 12 generates the comparison output signal comp out as a logic "low" signal to reset the n-bit counter 10. When the comparison output signal comp out is logic "low", the BEMF detection signal is checked to see if it is logic "high" at step 140. If the BEMF signal is not logic "high", the process returns to step 130. If the comparison output signal comp out is logic "low" and the BEMF detection signal is logic "high", the n-bit shift register 14 shifts 1-bit in a less significant bit direction. Thereafter, steps 130 and 140 are repeated. At step 150, the count value corresponding to a maximum frequency fmax is set in the n-bit shift register 14, and the n-bit counter 10 counts up in response to pulses of the main clock signal. If the count value of the n-bit counter 10 is equal to that of the n-bit shift register 14, the n-bit comparator 12 generates the comparison output signal comp out as a logic "low" signal and resets the n-bit counter 10. At step 160, a determination is made as to whether the BEMF detecting signal is logic "high". If the BEMF detection signal is not logic "high", the process returns to step 150. If the BEMF detection signal is logic "high", the normal operating mode is executed at step 170.

The comparison output signal comp out is supplied to a starting block as a reference clock for implementing rectification when starting the motor. Since a frequency of the comparison output signal comp out becomes a reference frequency of the starting block, the frequency of the comparison output signal comp out is proportional to a starting frequency. If the frequency of the comparison output signal comp out varies, the starting frequency also varies. If the starting frequency gradually increases, the degree of rotation of the motor increases and the back electromotive force induced to the motor gradually increases.

Figure 3:
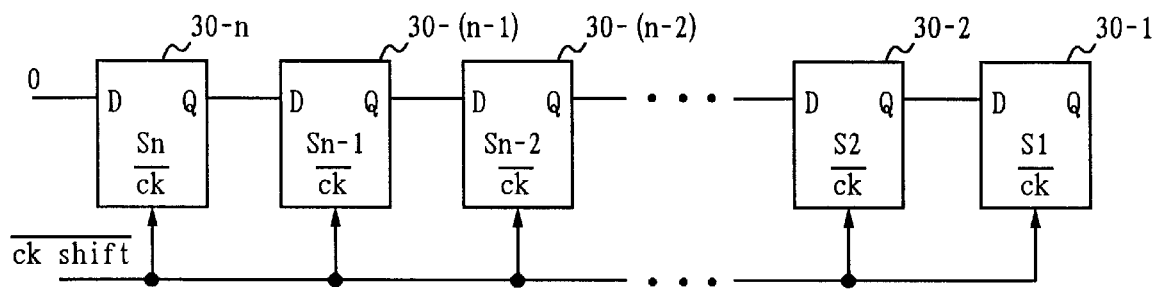
FIG. 3 is a detailed block diagram of an n-bit shift register shown in FIG. 1.

FIG. 3 is a detailed block diagram of the n-bit shift register 14 shown in FIG. 1. The n-bit shift register 14 consists of n flip-flops 30-n, 30-(n-1), . . . , 30-2, 30-1 and shifts data by one bit in response to the inverted clock shift signal $\overline{\text{ck shift}}$.

Figure 4:
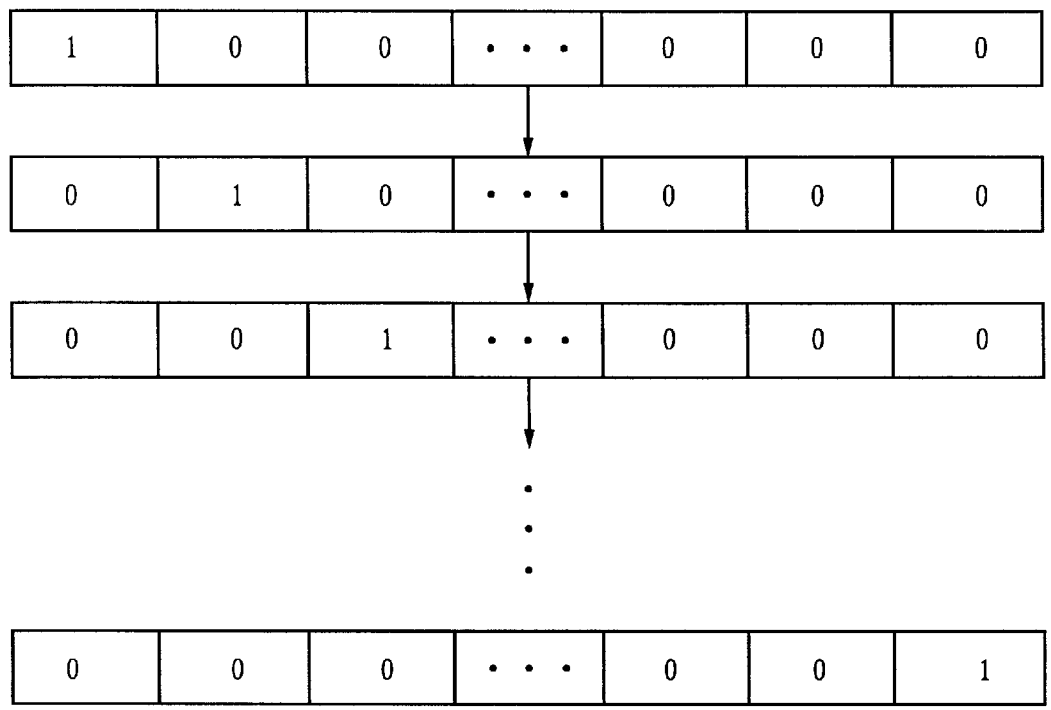
FIG. 4 shows a shifting process of n-bit data of an n-bit shift register shown in FIG. 1.

FIG. 4 shows a shifting process of the n-bit data of the n-bit shift register 14 shown in FIG. 1. The data shifts one bit by one bit from the most significant bit as follows:

"10000 . . . "→"01000 . . . "→"00100 . . . "→". . . 00001".

Figure 5:
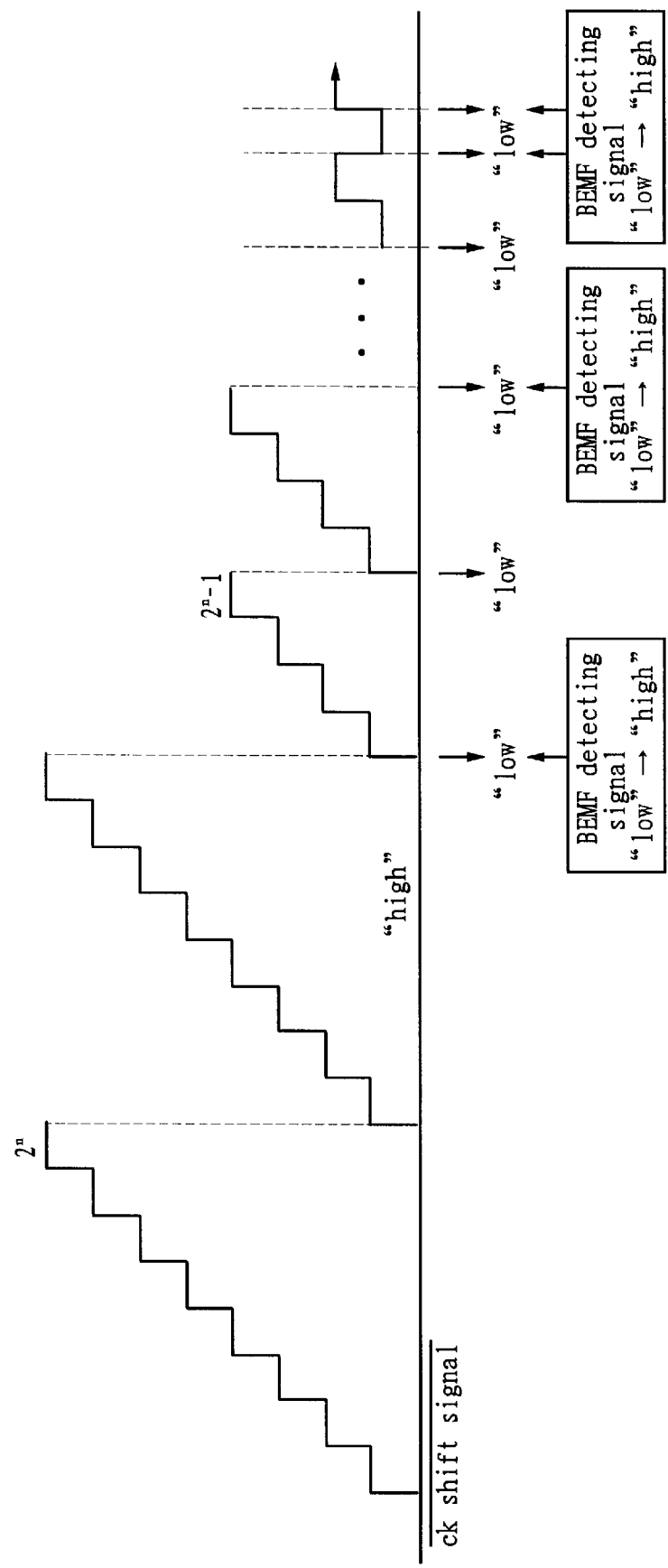
FIG. 5 shows an operation of an n-bit counter shown in FIG. 1.

FIG. 5 shows an operation of the n-bit counter 12 shown in FIG. 1. If the BEMF detection signal is changed from logic "low" to logic "high" and the comparison output signal comp out of the n-bit comparator 12 is set to logic "low", the inverted clock shift signal $\overline{\text{ck shift}}$ is changed from logic "high" to logic "low". Then the n-bit shift register 14 shifts by one less significant bit and the n-bit counter 12 counts up to the value set in the n-bit shift register 14. The n-bit counter 12 counts up to 8 initially, and next sequentially counts up to 4, 2 and 1.

In the above description, although the n-bit shift register doubles by shifting the low frequency value to obtain the high frequency value, an n-bit register or a microcomputer may be used to obtain some other relationship between the low frequency value and the high frequency value.

The starting circuit and starting method for the brushless motor of the present invention detect the back electromotive force each time the frequency of the comparison output signal varies to judge whether the motor rotates normally. Therefore, a starting failure can be prevented in which a change to the normal operating mode is prematurely effected during a state in which the motor does not rotate. If the frequency of the comparison output signal gradually increases, since the speed of the motor also gradually increases, the motor is smoothly accelerated during changeover to the normal operating mode.

What is claimed is:

1. A starting circuit for starting a brushless motor in response to a back electromotive force detection signal, comprising:

a frequency setting circuit for setting therein a frequency value;

a counter which increases a count value thereof in response to pulses of a main clock-signal;

a comparator which compares the frequency value set in said frequency setting circuit with the count value of said counter, and resets said counter when the compared values are the same; and a frequency changing circuit which changes the frequency value set in said frequency setting circuit to a higher frequency value in response to an output signal of said comparator and the back electromotive force detecting signal.

2. A starting circuit as claimed in claim 1, wherein said frequency setting circuit is an n-bit register, said counter is an n-bit counter, and said comparator is an n-bit comparator, and wherein said frequency changing circuit initiates a bit-shifting of said n-bit register to change the frequency value set in said n-bit register.

3. A starting circuit as claimed in claim 1, wherein an output signal of said comparator is applied to a starting block as a reference clock for implementing rectification when starting the brushless motor.

4. A starting circuit as claimed in claim 2, wherein an output signal of said comparator is applied to a starting block as a reference clock for implementing rectification when start the brushless motor.

5. A starting method for starting a brushless motor in response to a back electromotive force detection signal, said starting method comprising the steps of:

setting a frequency value in a memory;

counting pulses of a clock signal to obtain a corresponding count value;

comparing the frequency value and the count value and generating a comparison signal when the compared values are the same;

resetting the count value in response to the comparison output signal; and increasing the frequency value in the memory and returning to said counting step if said back electromotive force detection signal is generated, and returning to said counting step if said back electromotive force detection signal is not generated.

6. A starting method as claimed in claim 5, further comprising applying the comparison signal to a starting block as a reference clock for implementing rectification when starting the brushless motor.

* * * * *